United States Patent [19]
Labadie

[11] 3,805,934
[45] Apr. 23, 1974

[54] CLUTCH RELEASE BEARINGS

[75] Inventor: Jean-Francois Labadie, Annecy, France

[73] Assignee: Societe Nouvelle De Roulements, Annecy (Haute Savoie), France

[22] Filed: Sept. 18, 1972

[21] Appl. No.: 290,008

[30] Foreign Application Priority Data
Sept. 21, 1971 France .............. 71.33895

[52] U.S. Cl. ............ 192/98, 192/110 B, 308/187.1, 308/184
[51] Int. Cl. ...... F16c 27/06, F16c 1/24, F16c 33/78
[58] Field of Search .......... 308/233 X, 187.2, 187.1, 308/35, 233, 184; 192/98 X, 98, 110 B

[56] References Cited
UNITED STATES PATENTS

| 3,390,927 | 7/1968 | Adams | 308/233 X |
|---|---|---|---|
| 3,416,637 | 12/1968 | Maurice | 192/98 X |
| 3,549,221 | 12/1970 | Leak | 308/187.2 |
| 3,554,621 | 1/1971 | McAllister | 308/187.2 |
| 3,625,327 | 12/1971 | Birdsey | 192/98 X |
| 3,631,954 | 1/1972 | Coaley | 192/98 |

*Primary Examiner*—Benjamin W. Wyche
*Assistant Examiner*—Lance W. Chandler
*Attorney, Agent, or Firm*—Stevens, Davis, Miller & Mosher

[57] ABSTRACT

This clutch release bearing of the rolled-sheet ball-race type is characterized in that the inner ball-race 2 is assembled with the bearing ring 5 of the clutch control fork by means of an internal ring of deformable plastic material 6 of which the outer contour surrounds the inner contours of said bearing ball-race 2 and bearing ring 5, the inner bore of said plastic ring 6 corresponding to the diameter of the sliding shaft.

5 Claims, 3 Drawing Figures

CLUTCH RELEASE BEARINGS

The present invention relates in general to clutch release bearings and has specific reference to a release bearing applicable more particularly to diaphragm-type clutches. All release bearings associated with clutches of this character operate as angular-contract bearings; therefore, their internal geometry is designed accordingly. The method of manufacturing from rolled sheet stock the outer ball-race engaging the diaphragm, as well as the shape of the race engaged by the bearing plate of the clutch control fork, are well known.

In this respect and considering the state of the art, reference may be made to the U.S. Pat. No. 3.604.545 of Sept. 14, 1971, of same Applicant.

The clutch release bearing according to the present invention is adapted to be manufactured economically and is of particularly sturdy and compact design, while having a low inertia, and being substantially fluid-tight and noiseless in operation.

The invention is concerned more particularly with the assembling of the ball-race with the ring or plate engaged by the clutch control fork, this assembling being performed by using a suitable synthetic resin either injected against the two rings to constitute inserts, or shaped or moulded separately, and subsequently assembled with said rings.

Figure 1:
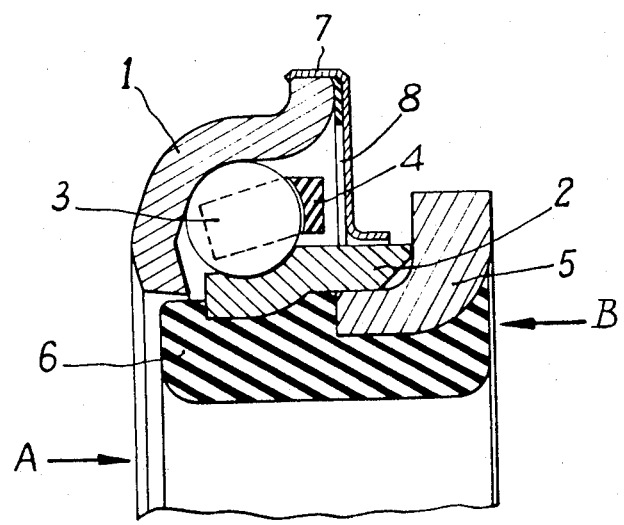
FIG. 1 is a diagrammatic fragmentary section of the clutch release bearing, showing the assembling of the outer ball-race with the ring or plate engaged by clutch control fork, as well as the mounting of the various other components of the bearing.

Referring to the drawing and more particularly to FIG. 1, it will be seen that the clutch release bearing according to this invention comprises an outer ball-race 1 and an inner ball-race 2 between which balls 3 are disposed and separated by a cage 4. The reference numeral 5 designates the bearing ring or plate engaged by the clutch control fork.

This invention is concerned more particularly with the assembling of the inner ball-race 2 with the bearing plate or ring 5 through an annular support 6 of adequate resin material either deposited by injection on the two rings to constitute inserts, or shaped separately and subsequently assembled with said rings. The inner bore of this support 6 corresponds to the diameter of the sliding shaft.

As shown in FIG. 1 the bearing is closed by a radial deflector 7 fitted to the outer ball-race 1, a gasket 8 being interposed therebetween. The diaphragm pressure face is shown by the arrow A, and the release direction of movement of the clutch control fork by the arrow B.

Figure 2:
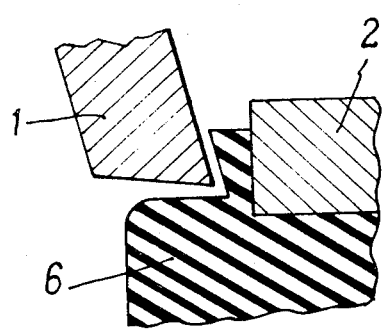
FIG. 2 is a modified detail of the form of embodiment of the bearing shown in FIG. 1.
Figure 3:
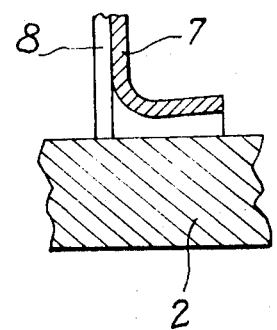
FIG. 3 is a detail, shown on a larger scale, of the arrangement of FIG. 1, for the purpose of facilitating the ejection of any dust or foreign bodies tending to penetrate into the bearing.

The role of the synthetic assembling resin is multifarious:

it avoids the use of conventional connecting or fastening means, such as welding, riveting, cementing, etc., constituting a current source of distortion or requiring an accurate equidistance of holes, or a perfect cleanliness of the surfaces in mutual contact;

it permits of fitting a same type of clutch release bearing with different bores adaptable in different clutches;

it provides a lateral fluid-tightness on the diaphragm side by causing the inclined edge of the ring constituting the outer ball-race 1 to engage a bearing surface and a counter-gradient formed on the support 6 of synthetic resin, as shown in FIG. 2. To this end, the support 6 has an extension on the diaphragm side and engages the inner edge of the outer ball-race 1, said inner edge being bent inwards to constitute a sealing bearing edge;

it co-acts with the counter-gradients of the outer ball-race 1 and deflector 7, the former being level with support 6, the latter registering with the inner ball-race 2 (FIG. 3) to facilitate the ejection of any dust or foreign bodies likely to penetrate into the bearing.

On the other hand, any vibrations are absorbed by this support 6, thus preventing the balls from forming impressions in the ball-races.

Although a specific form of embodiment of the present invention has been shown and described herein, it will readily occur to those skilled in the art that various modifications and variations may be resorted to without departing from the spirit and scope of the invention as set forth in the appended claims.

What is claimed as new is:

1. Clutch release bearing of the type adapted to be positioned about the sliding shaft of a clutch comprising an outer ball-race and an inner ball-race between which the balls are disposed in a cage, characterized in that the inner ball-race is positioned between the balls and the sliding shaft, said inner ball-race and the bearing ring of the clutch control fork are assembled together by means of an annular support of deformable plastic material of which the outer contour encloses and is in contact with the inner contours of said inner ball-race and bearing ring, the inner bore of said annular support corresponding to the diameter of the sliding shaft.

2. Clutch release bearing according to claim 1 wherein said deformable plastic material constituting said annular support comprises a porous, self-lubricating composition.

3. Clutch release bearing according to claim 2, wherein said support of deformable plastic material has an extension engaging the inner edge of said outer ball-race for sealing the joint therebetween.

4. Clutch release bearing according to claim 1, wherein said the outer ball-race has a lip-forming extensions bent inwards and laterally to constitute a sealing bearing.

5. Clutch release bearing according to claim 1 furthing comprising, in addition to the inner and outer ball-races, a deflector closing the bearing and extending in the radial direction, said deflector terminating on the inner side with a lip inclined inwards with respect to surface of the inner ball-race co-acting therewith.

* * * * *